United States Patent
Sorelli et al.

(10) Patent No.: US 12,037,286 B2
(45) Date of Patent: Jul. 16, 2024

(54) HIGH-STRENGTH CONCRETE AND METHOD OF PRODUCING SAME

(71) Applicant: UNIVERSITE LAVAL, Québec (CA)

(72) Inventors: Luca Sorelli, Quebec (CA); David Bouchard, Québec (CA)

(73) Assignee: UNIVERSITE LAVAL, Quebec (CA)

( * ) Notice: Subject to any disclaimer, the term of this patent is extended or adjusted under 35 U.S.C. 154(b) by 0 days.

(21) Appl. No.: 18/150,234

(22) Filed: Jan. 5, 2023

(65) Prior Publication Data

US 2023/0219844 A1 Jul. 13, 2023

Related U.S. Application Data

(60) Provisional application No. 63/297,280, filed on Jan. 7, 2022.

(51) Int. Cl.
| | |
|---|---|
| C04B 14/28 | (2006.01) |
| C04B 14/04 | (2006.01) |
| C04B 14/36 | (2006.01) |
| C04B 14/48 | (2006.01) |
| C04B 40/00 | (2006.01) |
| C04B 28/04 | (2006.01) |
| C04B 103/32 | (2006.01) |

(52) U.S. Cl.
CPC ............ C04B 14/36 (2013.01); C04B 14/048 (2013.01); C04B 14/285 (2013.01); C04B 14/48 (2013.01); C04B 40/0039 (2013.01); C04B 28/04 (2013.01); C04B 2103/32 (2013.01); C04B 2201/52 (2013.01); Y02W 30/91 (2015.05)

(58) Field of Classification Search
CPC ..... C04B 14/36; C04B 14/048; C04B 14/285; C04B 14/48; C04B 40/0039; C04B 2103/32; C04B 2201/52; C04B 14/28; C04B 14/00; C04B 14/26; C04B 14/02; C04B 14/068; C04B 40/00; C04B 2201/00; C04B 2111/1025; C04B 2111/10; C04B 28/04; C04B 20/008; C04B 14/06; C04B 18/146; C04B 18/08; C04B 14/22; Y02W 30/91
See application file for complete search history.

(56) References Cited

U.S. PATENT DOCUMENTS

| | | | |
|---|---|---|---|
| 5,531,823 A | 7/1996 | Breton | |
| 5,584,926 A * | 12/1996 | Borgholm | C04B 28/04 |
| | | | 106/815 |
| 6,080,234 A * | 6/2000 | Clavaud | C04B 28/02 |
| | | | 106/710 |
| 7,901,504 B2 | 3/2011 | Batoz et al. | |
| 2009/0158965 A1 | 6/2009 | Andersen et al. | |
| 2009/0229495 A1 | 9/2009 | Cangiano | |
| 2010/0043673 A1* | 2/2010 | Batoz | C04B 28/04 |
| | | | 106/737 |
| 2010/0068533 A1 | 3/2010 | Chanvillard et al. | |
| 2011/0083585 A1 | 4/2011 | Fonollosa | |
| 2012/0152153 A1 | 6/2012 | Gong et al. | |
| 2014/0039097 A1* | 2/2014 | Zacarias | C04B 28/04 |
| | | | 524/5 |
| 2015/0047533 A1* | 2/2015 | Kastner | B28B 1/20 |
| | | | 106/737 |
| 2018/0162774 A1 | 6/2018 | Zampini et al. | |
| 2018/0179111 A1* | 6/2018 | Fang | C04B 14/28 |
| 2018/0194679 A1* | 7/2018 | Guynn | C04B 7/02 |
| 2020/0010366 A1 | 1/2020 | Gonnon et al. | |
| 2020/0276729 A1 | 9/2020 | Horgnies et al. | |

FOREIGN PATENT DOCUMENTS

| | | |
|---|---|---|
| CN | 105837119 A | 8/2016 |
| CN | 109721306 A | 5/2019 |
| EP | 2145869 | 1/2010 |
| FR | 2904826 | 2/2008 |
| FR | 3657014 | 5/2020 |
| GB | 2564129 | 1/2019 |
| RU | 2247089 | 2/2005 |
| RU | 2271344 | 3/2006 |
| WO | 2010149893 | 12/2010 |
| WO | 2015055878 | 4/2015 |
| WO | 2016042248 | 3/2016 |
| WO | 2017137824 | 8/2017 |
| WO | 2017167321 A1 | 10/2017 |

OTHER PUBLICATIONS

The Concrete Countertop Institute. Superplasticizer [retrieved from the internet at Nov. 25, 2023 from <URL:https://concretecountertopinstitute.com/free-training/concrete-countertop-mix-ingredients-and-admixtures/>] (Year: 2020).*

NPL—Cepuritis et al. Sand production with VSI crushing and air classification: Optimising fines grading for concrete production with microproportioning.Minerals Engineering, vol. 78, Jul. 2015, pp. 1-14 (https://www.sciencedirect.com/science/article/pii/S0892687515001156).

* cited by examiner

*Primary Examiner* — Anthony J Green
*Assistant Examiner* — Marites A Guino-O Uzzle
(74) *Attorney, Agent, or Firm* — Reno Lessard; Norton Rose Fulbright Canada LLP (57) ABSTRACT

There is described a high-strength concrete generally having: about 100 parts by weight of cement; about 60 to about 360 parts by weight of fine aggregates; about 90 to about 230 parts by weight of mineral powder having a diameter D50 below 150 μm; about 0.1 to about 25 parts by weight of superplasticizer; and about 20 to about 65 parts by weight of water, the high-strength concrete has a cement content less than about 500 kg/m$^3$ and having a compressive strength after 28 curing days of about 55 MPa or greater.

17 Claims, 5 Drawing Sheets

HIGH-STRENGTH CONCRETE AND METHOD OF PRODUCING SAME

FIELD

The improvements generally relate to concrete and more specifically to high-strength concretes.

BACKGROUND

High-strength concretes are a type of concrete that meet a predefined compressive strength requirement. The compressive strength requirement varies from one country to another, and is generally defined by dedicated organisms. For instance, in Canada, the Canadian Standards Association (CSA) is tasked with standardizing how the different types of concrete are defined across the country. The CSA defines the compressive strength requirement for high-strength concretes as being above 55 MPa as per conventional compressive strength tests measuring the minimum compressive strength at the age of 28 days. Ultra high-strength concrete is generally defined as concrete having a compressive strength above 100, preferably above 110, most preferably above 120 MPa after 28 curing days, to give another standard example. Although existing high-strength concretes are satisfactory to a certain degree, there remains room for improvement.

SUMMARY

Existing high-strength concretes are known to have a relatively high cement content. For instance, most of the currently available ultra high-strength concretes have a cement content ranging between 700 kg/m$^3$ and 900 kg/m$^3$. As the cement industry is one of the most energy-intensive of all the manufacturing industries in at least some countries, there is an incentive in providing high-strength concretes with a reduced cement content. However, simply reducing the cement content of a concrete generally implies a corresponding reduction in compressive strength, which in turn typically fail to meet the high-strength requirement require to bear the high-strength qualifier.

It was found that by reducing the cement content under 500 kg/m$^3$ and by incorporating a given amount of mineral powder, such as granite powder and/or marble powder, where the particles of the mineral powder have a median diameter below 150 μm, one can obtain a concrete that has a low cement content while still meeting the high-strength requirement which is mandatory to secure the high-strength qualifier. In some embodiments, the mineral powder can be a residue obtained from any stone manufacturing plant or quarry which can be environmentally and economically desirable. In order to achieve high and very high strength concretes, the proportions of mineral powders is optimized by maximising the overall wet compaction of powders with cement grains. One of the main challenges is to do so without detrimentally effecting on the workability of fresh concretes as fine powders can absorb water on their surface. Thus, an optimal combination of cement, water, chemical admixtures and mineral powders with a certain size distribution and chemical composition is found to achieve concretes high and very high strength.

In this disclosure, as some concrete ingredients are particular, it was found convenient to describe these particular concrete ingredients using particle size distribution (PSD) terminology. The PSD terminology is used to qualitatively describe whether a particular concrete ingredient has a narrow or broad size distribution, to express whether the particle size of that distribution is large or small, and/or to qualify the distribution shape, to name a few examples. Particle size can be expressed in terms of a diameter, a radius, or any suitable dimension. For instance, PSD terminology can include many different terms including, but not limited to, DX diameter or LX length where X is a percentage value such as 10, 50, 90 and the like. For instance, a D50 diameter is a value known as the median diameter of the particle size distribution, i.e., 50% of the particles of that distribution are below the D50 diameter. D10 and D90 diameters are values known as the lower and upper endpoints of the PSD. More specifically, while the D10 diameter indicates that 10% of the particles of that distribution are below the D10 diameter, the D90 diameter indicates that 90% of the particles of that distribution are below the D90 diameter. Whereas the D50 diameter helps determining what is the mean particle size of a distribution, the D10 and D90 diameters help determining whether the distribution is broad or narrow.

In accordance with a first aspect of the present disclosure, there is provided a high-strength concrete comprising: about 100 parts by weight of cement; about 60 to about 360 parts by weight of fine aggregates; about 90 to about 230 parts by weight of mineral powder having a diameter D50 below 150 μm; about 0.1 to about 25 parts by weight of superplasticizer; and about 20 to about 65 parts by weight of water, the high-strength concrete has a cement content less than about 500 kg/m$^3$ and having a compressive strength after 28 curing days of about 55 MPa or greater.

Further in accordance with the first aspect of the present disclosure, the mineral powder can for example include above 20% by weight of one or more materials having a D50 diameter above the D50 diameter of the cement, and above 20% by weight of one or more materials having a D50 diameter below the D50 diameter of the cement.

Still further in accordance with the first aspect of the present disclosure, the mineral powder can for example have a D50 diameter within 30% of a D50 diameter of the cement, and includes granite powder having a D50 diameter more than 5% above the D50 diameter of the cement, and at least one other material having a D50 diameter more than 5% below the D50 diameter of the cement.

Still further in accordance with the first aspect of the present disclosure, the D50 diameter of the mineral powder can for example be below 100 μm, preferably below 50 μm.

Still further in accordance with the first aspect of the present disclosure, the cement content can for example be less than about 490 kg/m$^3$, preferably less than about 480 kg/m$^3$, and most preferably less than about 470 kg/m$^3$.

Still further in accordance with the first aspect of the present disclosure, the parts by weight of mineral powder can for example range between about 100 and about 220, preferably between about 125 and about 195 and most preferably between about 150 and about 170.

Still further in accordance with the first aspect of the present disclosure, the mineral powder can for example comprise granite powder.

Still further in accordance with the first aspect of the present disclosure, the mineral powder can for example comprise marble powder.

Still further in accordance with the first aspect of the present disclosure, the compressive strength after 28 curing days can for example be at least 60 MPa, preferably at least 65 MPa and most preferably at least 70 MPa or greater.

Still further in accordance with the first aspect of the present disclosure, the high strength concrete can for example comprise at least 0.2% by volume of reinforcing fibers.

Still further in accordance with the first aspect of the present disclosure, the compressive strength after 28 curing days can for example be at least 90 MPa, preferably at least 100 MPa and most preferably at least 110 MPa or greater.

Still further in accordance with the first aspect of the present disclosure, the reinforcing fibers can for example comprise steel fibers.

Still further in accordance with the first aspect of the present disclosure, the steel fibers can for example have an aspect ratio ranging between 10 and 200, preferably between 50 and 100, and most preferably of about 65.

Still further in accordance with the first aspect of the present disclosure, the fine aggregates can for example have a single grading with a D10 to D90 between 0.05 mm and 5 mm, the finest fine aggregate having a D10 to D90 between 0.05 mm and 1 mm, and the coarsest fine aggregate having a D10 to D90 between 1 mm and 5 mm.

Still further in accordance with the first aspect of the present disclosure, the high-strength concrete can for example further comprise about 90 to 230 parts by weight of coarse aggregates, the coarse aggregates having a single grading with a D10 to D90 between 5 mm and 35 mm.

Still further in accordance with the first aspect of the present disclosure, the parts by weight of fine aggregates can for example range between about 80 and about 340, preferably between about 135 and about 285, and most preferably between about 200 and 220; the parts by weight of mineral powder range between about 100 and about 220, preferably between about 125 and about 195 and most preferably between about 150 and about 170; the parts by weight of superplasticizer range between about 1 and 24, preferably between about 7 and about 17 and most preferably between 10 and 14; the parts by weight of water range between about 25 and about 60, preferably between about 30 and about 52, and most preferably between about 38 and 46; and wherein the cement content is less than about 490 kg/m$^3$, preferably less than about 480 kg/m$^3$, and most preferably less than about 470 kg/m$^3$.

Still further in accordance with the first aspect of the present disclosure, the parts by weight of fine aggregates can for example range between about 200 and 220; the parts by weight of mineral powder range between about 150 and about 170; the parts by weight of superplasticizer range between 10 and 14; the parts by weight of water range between about 38 and 46; and wherein the cement content is less than about 470 kg/m$^3$.

Still further in accordance with the first aspect of the present disclosure, the cement can for example have an alkali concentration of less than 0.6% weight percent with respect to the total weight of the cement.

Still further in accordance with the first aspect of the present disclosure, the mineral powder can for example comprise at least 10 parts by weight of granite powder.

Still further in accordance with the first aspect of the present disclosure, the mineral powder can for example comprise at least 35 parts by weight of limestone powder.

Still further in accordance with the first aspect of the present disclosure, the high-strength concrete can for example comprise at least 5 parts by weight of silica fume.

Still further in accordance with the first aspect of the present disclosure, a portion of the mineral powder and a portion of the water can for example be provided in the form of a sludge.

In accordance with a second aspect of the present disclosure, there is provided a high-strength concrete mix comprising: about 100 parts by weight of cement; about 60 to about 360 parts by weight of fine aggregates; and about 90 to about 230 parts by weight of mineral powder having a diameter D50 below 150 µm, which, when mixed with about 20 to about 65 parts by weight of water and about 0.1 to about 25 parts by weight of superplasticizer, forms a high-strength concrete having a cement content less than about 500 kg/m$^3$ and having a compressive strength after 28 curing days of about 55 MPa or greater.

Further in accordance with the second aspect of the present disclosure, the parts by weight of mineral powder can for example range between about 100 and about 220, preferably between about 125 and about 195 and most preferably between about 150 and about 170.

Still further in accordance with the second aspect of the present disclosure, the mineral powder can for example comprise granite powder.

Still further in accordance with the second aspect of the present disclosure, high-strength concrete mix can for example further comprise at least 0.2% by volume of reinforcing fibers.

In accordance with a third aspect of the present disclosure, there is provided a method of producing a batch of high-strength concrete, the method comprising: mixing concrete ingredients, for example into a drum, the concrete ingredients having about 100 parts by weight of cement, about 60 to about 360 parts by weight of fine aggregates, about 90 to about 230 parts by weight of mineral powder having a diameter D50 below 150 µm, about 0.1 to about 25 parts by weight of superplasticizer, and about 20 to about 65 parts by weight of water, with a cement content less than about 500 kg/m$^3$ of cement.

Still in accordance with the third aspect of the present disclosure, the method can for example further include, prior to said mixing, drying a mineral powder containing sludge thereby obtain said mineral powder.

In this disclosure, the quantification of the compressive strength of a concrete is obtained by measuring the minimum compressive strength at which 28-day-old cylinders of that concrete fail. The 28 curing days timeframe is arbitrary and is only used as a way to quantitatively express the compressive strength of the high-strength concrete described herein.

Many further features and combinations thereof concerning the present improvements will appear to those skilled in the art following a reading of the instant disclosure.

DETAILED DESCRIPTION

There is described a high-strength concrete. The high-strength concrete has: about 100 parts by weight of cement; about 60 to about 360 parts by weight of fine aggregates; about 90 to about 230 parts by weight of mineral powder having a diameter D50 below 150 µm; about 0.1 to about 25 parts by weight of superplasticizer; and about 20 to about 65 parts by weight of water. As discussed further below, the high-strength concrete has a cement content less than about 500 kg/m$^3$ and a compressive strength after 28 curing days of about 55 MPa or greater. In some embodiments, the high-strength concrete can be a high-performance concrete (HPC) meeting durability and workability requirements in addition to the strength requirement as defined by dedicated standardization organisms.

In some embodiments, the cement content is less than about 490 kg/m$^3$, preferably less than about 480 kg/m$^3$, and most preferably less than about 470 kg/m$^3$. The cement can be any type of cement including, but not limited to, ordinary Portland cement (OPC), Portland pozzolana cement (PPC), rapid hardening cement, extra rapid hardening cement, low heat cement, sulfates resisting cement, white cement and the like. In preferred embodiments, the cement is a low-alkali cement such as a GU low-alkali cement. The most common alkalis in cement are $Na_2O$ and $K_2O$. The term "low-alkali" as used herein in the context of cement can be defined as a cement having less than 0.6 weight percent of total alkali with respect to the total weight of the composition. In some embodiments, the total alkali weight can be calculated with $Na_2O$ only or with $Na_2O+0.658K_2O$.

In some embodiments, the parts by weight of mineral powder range between about 100 and about 220, preferably between about 125 and about 195 and most preferably between about 150 and about 170. Examples of mineral powders can include, but are not limited to, igneous rock powder (e.g., granite powdery), marble powder, quartz powder, limestone powder, or a combination thereof. The mineral powder stone is inert. An inert material is defined as having no or very limited pozzolanic activity. The particles of the mineral powder are defined as having a diameter D50 below 150 µm. However, in some other embodiments, the D50 diameter of the mineral powder can preferably be below 145 µm, and most preferably below 140 µm in some other embodiments. The mineral powder used in the high-strength concrete can have a D10 diameter below 100 µm, preferably below 10 µm, and most preferably below 5 µm. The mineral powder used in the high-strength concrete can have a D90 diameter below 250 µm, preferably below 150 µm, and most preferably below 100 µm. The use of mineral powder in the ranges disclosed herein can provide the advantage of providing enhanced granulometry and structure to the concrete composition which allows to reduce the amount of cement while still achieving desirable compressive strength properties. Moreover, the mineral powder is a cost effective alternative to cementitious materials (such as supplementary cementitious material including, but not limited to, silica fume, fly ash, and glass powder) which are relatively costly.

Figure 1:
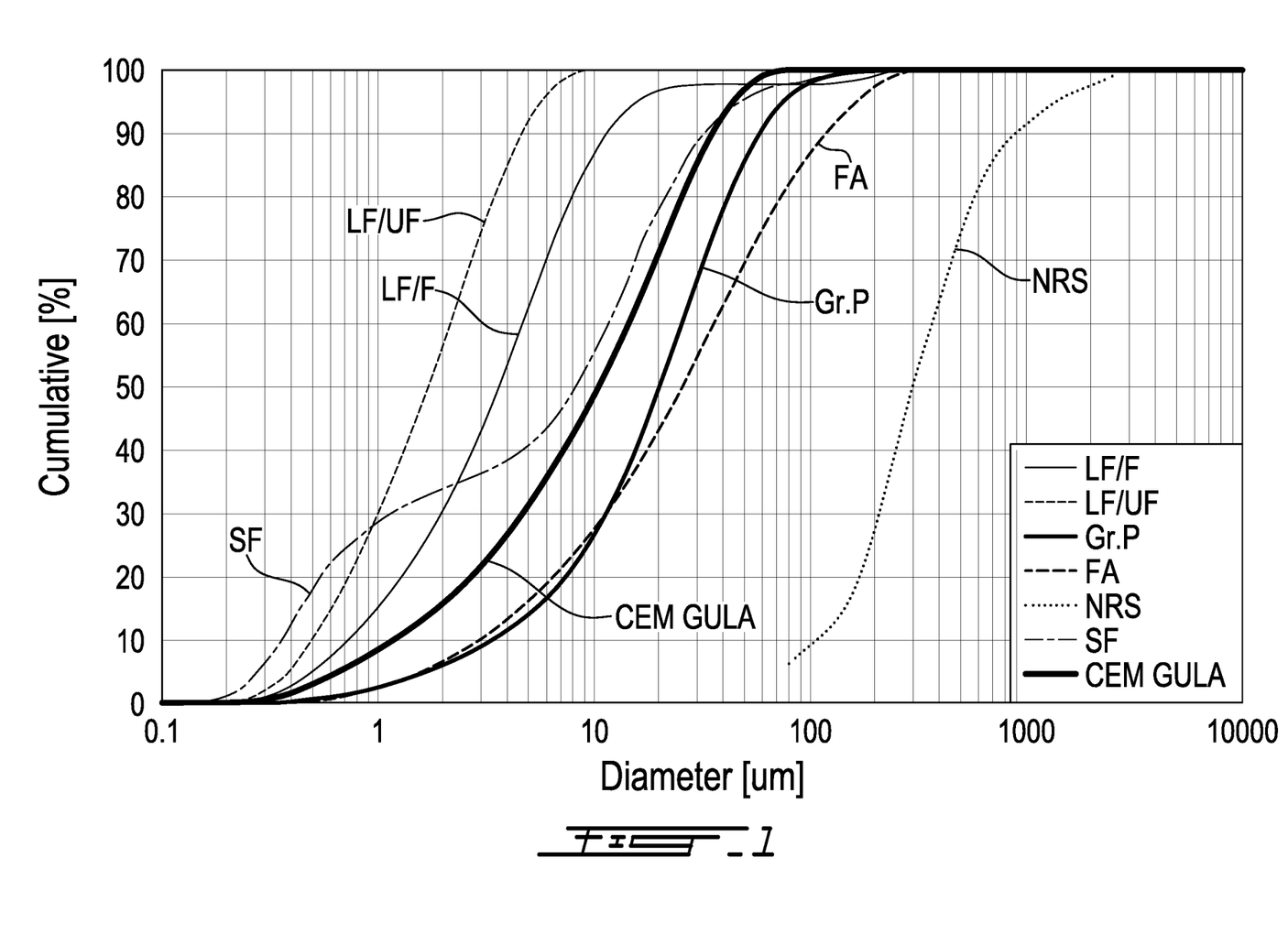
FIG. 1 is a graph of the particle distribution (cumulative % in function of diameter) for limestone filler (LF/F and LF/UF), granite powder (Gr. P), fly ash (FA), NRS, silica fumes (SF), and cement (CEM GULA).
Figure 2:
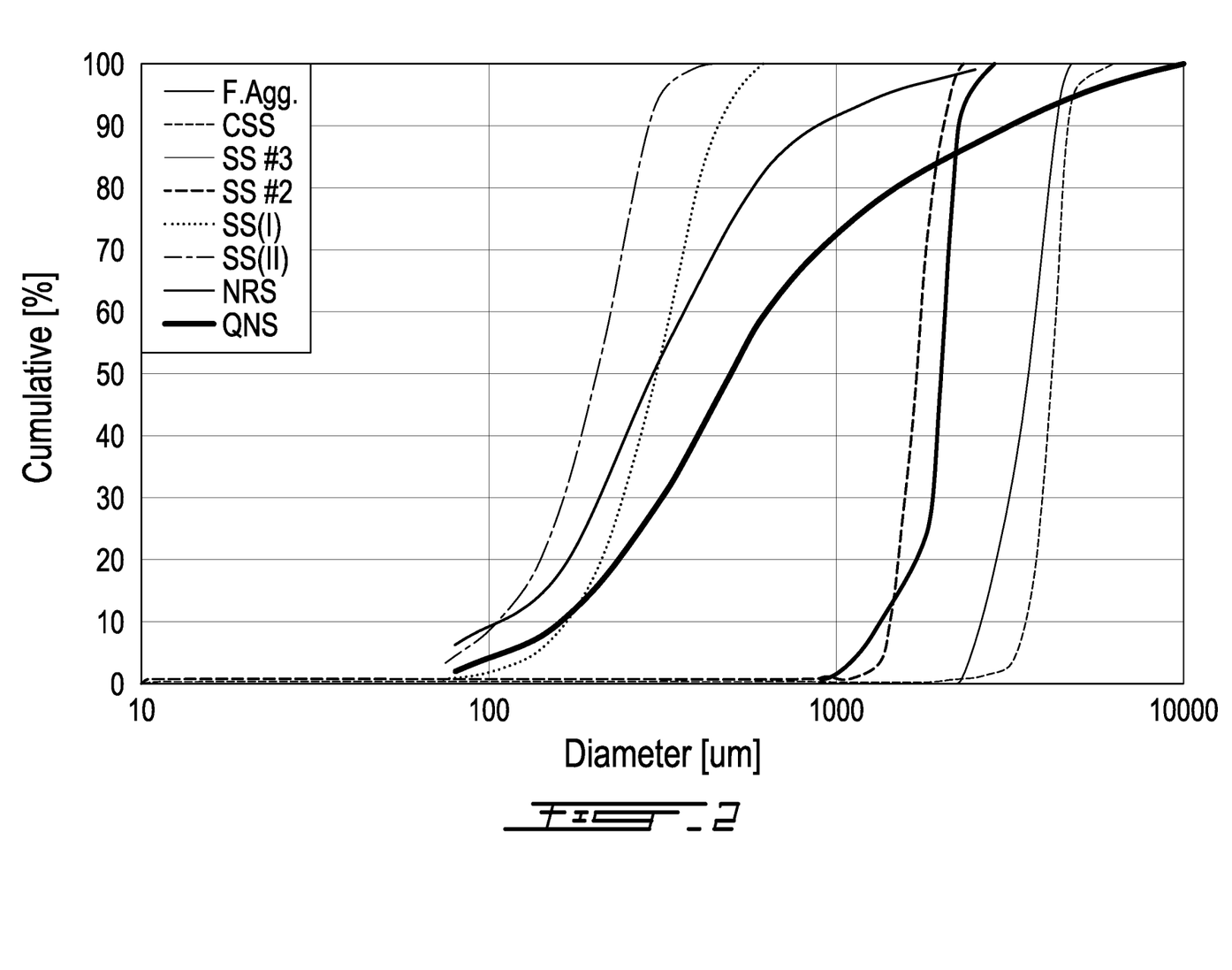
FIG. 2 is a graph of the particle distribution (cumulative % in function of diameter) for sands and other fine aggregates.
Figure 3:
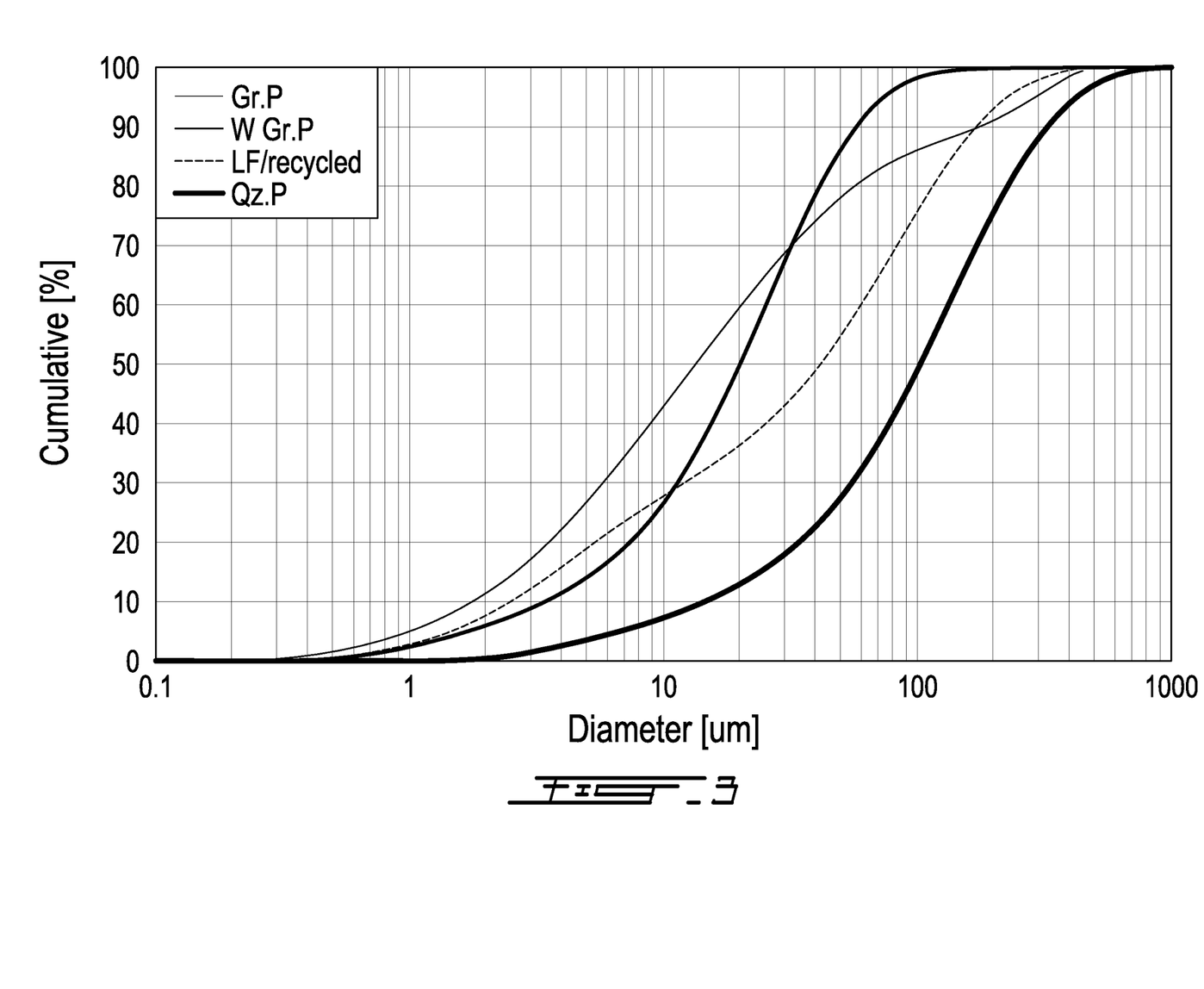
FIG. 3 is a graph of the particle distribution (cumulative % in function of diameter) of recycled powders, namely granite powder (Gr. P), white granite powder (W Gr. P), limestone filler (LF) recycled, and quartz powder (Qz. P).
Figure 4:
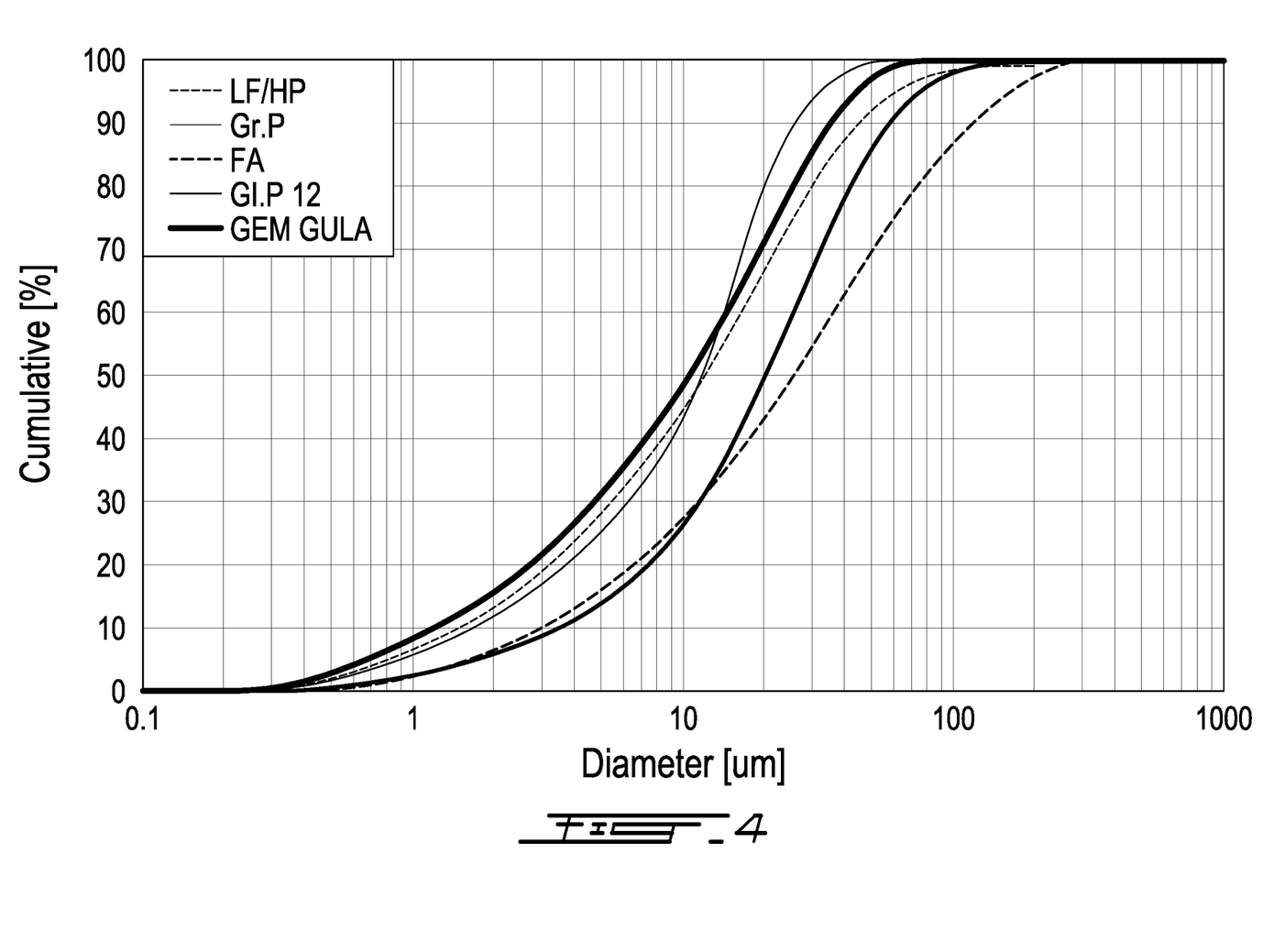
FIG. 4 is a graph of the particle distribution (cumulative % in function of diameter) of fillers compared to CEM GULA.

In some embodiments, the mineral powder comprises or is granite powder. In some embodiments, the concrete comprises at least 10 parts by weight of granite powder, at least 20 parts by weight of granite powder, at least 30 parts by weight of granite powder, at least 40 parts by weight of granite powder, or about 50 parts by weight of granite powder. As can be seen in FIG. 1, granite powder (Gr. P) has a larger average diameter than cement (CEM GULA). Indeed, in the present concrete compositions with reduced concrete (less than 500 kg/m$^3$). However, it was found that the addition of granite powder could reduce the workability of the mixture. In some embodiments considered, as shown in FIG. 1 the granite powder has a D50 diameter above the D50 diameter of the cement which it is intended to replace. In embodiments where one or more other mineral powder material having a smaller D50 diameter than the D50 diameter of the cement were used in addition to the mineral powder material having a D50 diameter above the D50 diameter of the cement, better workability was achieved. For instance, in some embodiments, the composition comprises, in addition to granite powder, fine and/or ultrafine limestone filler (LF/F, LF/UF) and/or silica fume which have a smaller diameter on average compared to cement, in a manner to provide an overall granulometry more consistent with the cement, which may limit the workability issues that may otherwise arise with the addition of granite powder. In further embodiments, the composition additionally to the granite powder comprises silica fume and limestone filler. For example, the composition can further comprise at least 35 parts by weight of limestone filler, more preferably at least 45 parts by weight of limestone filler, even more preferably 55 parts by weight of limestone filler, still preferably at least 65 parts by weight of limestone filler, and/or at least 5 parts by weight of silica fume, preferably at least 10 parts by weight of silica fume, more preferably at least 15 parts by weight of silica fume, and even more preferably 20 parts by weight of silica fume. Accordingly, more generally the mineral powder can comprise a first mineral powder that has a larger D50 diameter than cement on average (for example granite powder, white granite powder, quartz powder, coarse limestone or fly ash) and a second mineral powder that has a smaller D50 diameter than cement on average (for example fine and/or ultrafine limestone filler and/or silica fume) to obtain a granulometry of the mineral powder closer to the granularity of the cement (i.e. the granulometry of the combined first and second mineral powders).

Indeed, for instance, the high strength concrete can include mineral powders including above 20% by weight of one or more materials having a D50 diameter above the D50 diameter of the cement, and above 20% by weight of one or more materials having a D50 diameter below the D50 diameter of the cement.

Moreover, for instance, the mineral powders, overall, can have a D50 diameter within 30% of a D50 diameter of the cement, and includes both i) granite powder, white granite powder or quartz powder having a D50 diameter more than 5% above the D50 diameter of the cement, and at least one other material having a D50 diameter more than 5% below the D50 diameter of the cement, such as fine and/or ultrafine limestone filler and/or silica fume.

In some embodiments, the concrete compositions of the present disclosure contain no deliberate addition of fly ash or are free of fly ash. This can be an advantage as fly ash is becoming less common as the coal industry phases out and is replaced by other energy industries.

In some embodiments, the high-strength concrete has a compressive strength after 28 curing days of at least 60 MPa, preferably at least 65 MPa and most preferably at least 70 MPa or greater. To increase the compressive strength, at least 0.2 vol. % of reinforcing fibers can be incorporated into the high-strength concrete in some embodiments. In some embodiments, the high-strength concrete can have at least 2% by volume of reinforcing fibers, preferably at least 4% by volume of reinforcing fibers, and most preferably at least 5% by volume of reinforcing fibers. In some other embodiments, the reinforcing fibers can be omitted. By doing so, the compressive strength after 28 curing days can be at least 90 MPa, preferably at least 100 MPa and most preferably at least 110 MPa or greater depending on the embodiment. When the compressive strength of the concrete is above 120 MPa after 28 curing days, the high-strength concrete can be an ultra high-strength concrete. The reinforcing fibers can be any type of reinforcing fibers including, but not limited to, steel fibers, micro- or macro-fibers, polymeric fibers, composite fibers such as glass fiber and the like. In some embodiments, the reinforcing fibers have a single grading with a L10 to L90 length between about 6 mm and about 25 mm, preferably between about 8 mm and about 20 mm, and most preferably between about 10 mm and about 14 mm. The reinforcing fibers can have an aspect ratio ranging between 1 and 1000, preferably between 10 and 200 and most preferably between 50 and 100. It is noted that in embodiments where the reinforcing fibers are provided in the form of steel fibers, the aspect ratio can range between 10 and 200, preferably between 50 and 100 and most preferably of about 65. In some other embodiments, where the reinforcing fibers are made of polymer, the aspect ratio can be much greater. For instance, the aspect ratio of polymer reinforcing fibers can extend up to 1000.

In some embodiments, the fine aggregates have a single grading with a D10 to D90 between 0.05 mm and 5 mm, the finest fine aggregate having a D10 to D90 between 0.05 mm and 1 mm, and the coarsest fine aggregate having a D10 to D90 between 1 mm and 5 mm. However, these values can change from one embodiment to another. The fine aggregates can comprise sand in some embodiments. Examples of sand can include, but are not limited to, silica sand, masonry sand, river sand, crushed stone sand, utility sand, manufacturing sand, plastering sand, pit sand, coral sand, glass sand, gypsum sand, and the like.

In some examples, the high-strength concrete has about 90 to 230 parts by weight of coarse aggregates in addition to the other concrete ingredients. The coarse aggregates can have a single grading with a D10 to D90 between 5 mm and 35 mm, in some embodiments. However, these values can change from one embodiment to another. In some examples, the high-strength concrete can also have less than 150 parts by weight of cementitious powder. Examples of cementitious powder includes silica fume, fly ash and the like. The cementitious powder is pozzolanic. Pozzolanic materials are defined as materials which possess little to no cementitious value but which will, in powdered form and in the presence of water, react chemically with calcium hydroxide ($Ca(OH)_2$) at ordinary temperature to form compounds possessing cementitious properties. The quantification of the capacity of a pozzolan material to react with calcium hydroxide and water is given by measuring its pozzolanic activity. Mineral powders are known to be non-pozzolanic materials which have little or no pozzolanic activity.

In some high-strength concrete embodiments having about 100 parts by weight of cement, the parts by weight of fine aggregates range between about 80 and about 340; the parts by weight of mineral powder range between about 100 and about 220; the parts by weight of superplasticizer range between about 1 and about 24; the parts by weight of water range between about 25 and about 60 and the cement content is less than about 490 kg/m³.

In some high-strength concrete embodiments having about 100 parts by weight of cement, the parts by weight of fine aggregates range between about 135 and about 285; the parts by weight of mineral powder range between about 125 and about 195; the parts by weight of superplasticizer range between about 7 and about 17; the parts by weight of water range preferably between about 30 and about 52; and the cement content is less than about 480 kg/m³.

In some high-strength concrete embodiments having about 100 parts by weight of cement, the parts by weight of fine aggregates range between about 200 and 220; the parts by weight of mineral powder range between about 150 and about 170; the parts by weight of superplasticizer range between 10 and 14; the parts by weight of water range between about 38 and 46; and the cement content is less than about 470 kg/m³.

In some embodiments, the high-strength concrete can be provided without water as a concrete mix. In these embodiments, the high-strength concrete mix has: about 100 parts by weight of cement; about 60 to about 360 parts by weight of fine aggregates; and about 90 to about 230 parts by weight of mineral powder having a diameter D50 below 150 μm. The high-strength concrete mix, when mixed with about 20 to about 65 parts by weight of water and about 0.1 to about 25 parts by weight of superplasticizer, can form a high-strength concrete having a cement content less than about 500 kg/m³ and having a compressive strength after 28 curing days of about 55 MPa or greater. All the embodiments described above with respect to the high-strength concrete are applicable to the high-strength concrete mix.

In another aspect, there is described a method of producing a batch of high-strength concrete. The method has a step of mixing concrete ingredients. In some embodiments the step of mixing is performed with a drum. The concrete ingredients have about 100 parts by weight of cement, about 60 to about 360 parts by weight of fine aggregates, about 90 to about 230 parts by weight of mineral powder having a diameter D50 below 150 μm, about 0.1 to about 25 parts by weight of superplasticizer, and about 20 to about 65 parts by weight of water, with a cement content less than about 500 kg/m³ of cement. In some embodiments, the method includes, prior to the step of mixing, a step of drying a mineral powder containing sludge thereby obtaining the mineral powder of the concrete ingredients. Accordingly, the mineral powder can be obtained from recycling residue of various stone manufacturing plants. In some embodiments, a portion of the mineral powder and a portion of the water are provided in the form of a sludge. As such, the sludge can contain water and mineral powder. In these embodiments, it is noted that the quantity of water required in the recipe of the high-strength concrete that is to be added separately of the sludge can be reduced to account for the water contained in the sludge. For instance, if the recipe dictates a total quantity of water, and that the sludge is estimated to contain a given quantity of water, then the given quantity of water can be subtracted from the total quantity of water of the recipe. In some embodiments, a portion of the mineral powder is provided in the form of dried mineral powders whereas another portion of the mineral powder is provided in the form of a mineral powder containing sludge.

Figure 5:
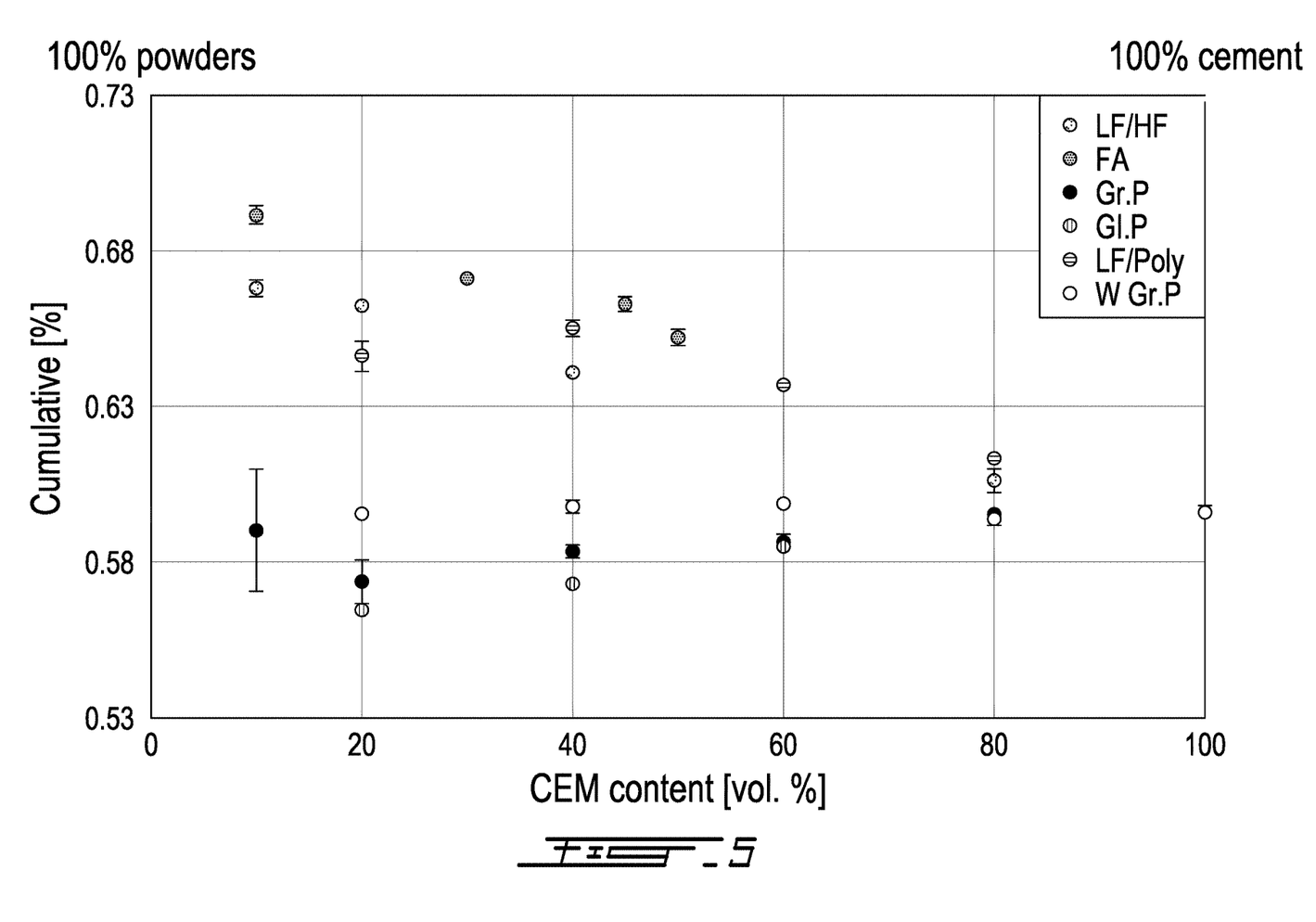
FIG. 5 is a dot plot showing the packing density of binary mixes combining CEM GU and fillers ($d_{90}$<150 mm) with 3% SP content.

The particle distribution of some of the concrete components used in the following examples are showed in FIGS. 1-4 and the packing density of binary mixes is shown in FIG. 5.

Example 1: Exemplary High-Strength Concrete Recipes

A first exemplary recipe comprised less than 500 kg/m³ of Portland cement, 300-1400 kg/m³ of fine aggregate (or sand, or mixture of sands) having a single grading with a D10 to D90 between 0.05 and 5 mm, 0-700 kg/m³ of a coarse aggregate having a single grading with a D10 to D90 between 5 and 35 mm, at least 500 kg/m³ of granite powder having a diameter D50 below 100 µm, 0-500 kg/m³ of limestone filler having a diameter D50 below 150 µm, 0-500 kg/m³ of marble filler having a diameter D50 below 150 µm, 0-500 kg/m³ of quartz filler having a diameter D50 below 150 µm, 50-900 kg/m³ of a combination of inert fillers made of natural stones, at least 600 kg/m³ of supplementary cementitious materials such as silica fume, fly ash and glass powder and 5 to 100 kg/m³ of superplasticizer as a dry composition. A corresponding wet composition contained additionally 100-250 kg/m³ of water. In some examples where a mixture of sands was used, the finest sand had a D10 to D90 between 0.05 and 1 mm and the coarsest sand had a D10 to D90 between 1 and 5 mm. Such exemplary high strength concrete recipes were determined to have a compression strength of at least 70 MPa. To obtain a ultra-high strength concrete with a compression strength of at least 120 MPa, at least 0.2% by volume of fibers reinforcement was added to the concrete.

Example 2: Cement Optimization

The cement GU low-alkali and the cement GU were used to obtain concrete composition with granite powder with recipes as recited in Example 1. (CSA 3001 defines type GU). The concrete compositions were compared and it was found that the GU low alkali cement out performed the GU cement in terms compressive strength by a difference of up to 20 MPa in some cases. Indeed, two concrete compositions produced with 200 kg of granite powder, 280 kg of limestone powder and 400 kg of either GU low-alkali cement or GU cement were compared and a difference of 20 MPa in compaction strength was found in favor of the GU low-alkali cement. This is a surprising result considering both cements tested had similar granulometry and composition.

Example 3: Compression Strength Evaluation

Two compositions according to the present disclosure (compositions A and B) are shown in Table 1 below. Their compression strength was determined after 28 curing days. The units in Table 1 unless specified otherwise are kg.

TABLE 1

Comparison of compositions A and B were compared with prior art

| Compositions: | A | B |
|---|---|---|
| Portland cement | 400 | 400 |
| Silica fume | 80 | 80 |
| Fly Ash | 200 | 0 |
| Fine glass powder | 0 | |
| Unspecified inert filler | 0 | |
| Limestone filler | 260 | 165 |
| Granite powder | 200 | 200 |
| Quartz powder | 0 | |
| Glass powder | 0 | |
| Glass sand | 0 | |
| Sand | 988 | 1280 |
| Coarse aggregate | 0 | 0 |
| Water | 168 | 176 |
| HRWR | 32 | 24 |
| Steel fibers | 2% | 0% |
| 28 d strength (MPa) | 128 | 97 |

A composition according to the present disclosure (composition C) is shown in Table 2 below. Its compression strength was determined after 28 curing days. The units in Table 2 unless specified otherwise are kg.

TABLE 2

Comparison of composition C with prior art

| Composition: | C |
|---|---|
| Portland cement | 354.2 |
| Silica fume | 30.8 |
| Limestone filler | 0 |
| Granite powder | 165 |
| Sand | 744 |
| Coarse aggregate | 1052 |
| High Range Water Reducer (HRWR) | 5.225 |
| Water | 152 |
| 28 d strength (MPa) | 70 |

Example 4: Composition Characterization

Exemplary compositions for ultra-high strength concrete (D-G) and high strength concrete (H-J) according to the present disclosure are presented in Table 3 and Table 5 respectively. Their properties are presented in Table 4 and Table 6 respectively.

TABLE 3

Compositions E-G

| Compositions: [in relative mass] | D | E | F | G |
|---|---|---|---|---|
| Cement GU | 1 | 1 | 1 | 1 |
| Supplementary cementing materials | 0.7 | 0.7 | 0.7 | 0.2 |
| Limestone powder | 0.65 | 0.65 | 0.65 | 0.41 |
| Granite powder | 0.5 | 0.5 | 0.5 | 0.5 |
| Fine aggregate | 2.45 | 2.48 | 2.47 | 2.92 |
| Superplasticizer | 0.08 | 0.08 | 0.08 | 0.06 |
| W/C ratio | 0.48 | 0.48 | 0.42 | 0.44 |

TABLE 4

Properties of compositions E-G

| Properties | D | E | F | G |
|---|---|---|---|---|
| Static spread w/ fiber, mm [ASTM C1437] | 175 | 205 | 240 | 245 |
| Dynamic spread w/ fiber, mm [ASTM C1437] | 215 | 230 | >250 | >250 |
| Static spread with fibers, mm [ASTM C1437] | 175 | 180 | 155 | — |
| Dynamic spread with fibers, mm [ASTM C1437] | 210 | 215 | 190 | — |
| $\sigma_c$ 28 days, MPa [ASTM C39] | 119.9 | 124.6 | 127.8 | 96.5 |

TABLE 5

Compositions H-J

| Composition [in relative mass] | H | I | J |
|---|---|---|---|
| Cement GUb-8SF | 1 | 1 | 1 |
| Coarse aggregate | 1.25 | 1.4 | 1.6 |
| Fine aggregate | 0.9 | 1 | 1.15 |
| Granite powder | 0.11 | 0.25 | 0.43 |
| Superplasticizer | 0.011 | 0.012 | 0.014 |
| W/C ratio | 0.31 | 0.35 | 0.39 |

TABLE 6

| Properties of compositions H-J | | | |
|---|---|---|---|
| Properties | H | I | J |
| $s_c$ 7 days, MPa [ASTM C39] | 67.73 | 58.2 | 57.48 |
| $s_c$ 28 days, MPa [ASTM C39] | 81.02 | 68.85 | 72.46 |
| Elastic Modulus 28 days, GPa [ASTM C469] | 39 | 39.8 | 39.9 |
| Electrical resistivity at 7 days, W m | 101 | 79 | 67 |
| Electrical resistivity at 28 days, W m | 375 | 298 | 277 |
| Slump, mm [ASTM C143] | 185 | 227 | 208 |
| Air content, % [ASTM C231 and ASTM C138] | 1.89 | 2.39 | 1.9 |
| Density, kg/m³ [ASTM C138] | 2478 | 2459 | 2470 |
| Volume of permeable voids, % [ASTM C642] | 9.79 | 9.42 | 10.37 |

As can be understood, the examples described above and illustrated are intended to be exemplary only. In some embodiments, the concrete ingredients can be quantified in terms of density instead of in terms of parts by weight of cement. In these embodiments, nominal densities for the concrete ingredients can be used. For instance, cement can have a density of 3100 kg/m³, fine aggregates can have a density of 2650 kg/m³, mineral powder can have a density of 2650 kg/m³, superplasticizer can have a density of 1060 kg/m³, water can have a density of 1000 kg/m³, and coarse aggregates can have a density of 1450-2100 kg/m³. The scope is indicated by the appended claims.

What is claimed is:

1. A high-strength concrete comprising: 100 parts by weight of cement; 60 to 360 parts by weight of fine aggregates having a D50 diameter above 100 um; 90 to 230 parts by weight of mineral powder having a D50 diameter below 150 μm; 0.1 to 25 parts by weight of superplasticizer; and 20 to 65 parts by weight of water, the high-strength concrete has a cement content less than 500 kg/m³ and has a compressive strength after 28 curing days of 55 MPa or greater, the mineral powder comprising igneous rock powder.

2. The high strength concrete of claim 1 wherein the mineral powder includes above 20% by weight of one or more materials having a D50 diameter above the D50 diameter of the cement, and above 20% by weight of one or more materials having a D50 diameter below the D50 diameter of the cement.

3. The high strength concrete of claim 1 wherein the mineral powder has a D50 diameter within 30% of a D50 diameter of the cement and includes igneous rock powder having a D50 diameter more than 5% above the D50 diameter of the cement, and at least one other material having a D50 diameter more than 5% below the D50 diameter of the cement.

4. The high strength concrete of claim 1 wherein the D50 diameter of the mineral powder is below 100 μm.

5. The high-strength concrete of claim 1 wherein the cement content is less than 490 kg/m³.

6. The high-strength concrete of claim 1 wherein the parts by weight of mineral powder range between 100 and 220.

7. The high-strength concrete of claim 1 further comprising at least 0.2% by volume of reinforcing fibers.

8. The high-strength concrete of claim 7 wherein the reinforcing fibers comprise steel fibers.

9. The high-strength concrete of claim 8 wherein the steel fibers have an aspect ratio ranging between 10 and 200.

10. The high-strength concrete of claim 1 wherein the cement has an alkali concentration of less than 0.6% weight with respect to a total weight of the cement.

11. The high-strength concrete of claim 1 wherein the mineral powder comprises at least 10 parts by weight of igneous rock powder.

12. The high-strength concrete of claim 1 wherein the mineral powder comprises at least igneous rock powder and limestone powder.

13. The high-strength concrete of claim 1 wherein a portion of the mineral powder and a portion of the water are provided in the form of a sludge.

14. A high-strength concrete mix comprising: 100 parts by weight of cement; 60 to 360 parts by weight of fine aggregates; and 90 to 230 parts by weight of mineral powder having a diameter D50 below 150 μm, which, when mixed with 20 to 65 parts by weight of water and 0.1 to 25 parts by weight of superplasticizer, forms a high-strength concrete having a cement content less than 500 kg/m³ and having a compressive strength after 28 curing days of 55 MPa or greater, the mineral powder comprising igneous rock powder.

15. The high-strength concrete mix of claim 14 wherein the parts by weight of mineral powder ranges between 100 and 220.

16. A method of producing a batch of high-strength concrete, the method comprising: mixing concrete ingredients into a drum, the concrete ingredients having 100 parts by weight of cement, 60 to 360 parts by weight of fine aggregates, 90 to 230 parts by weight of mineral powder having a diameter D50 below 150 μm, 0.1 to 25 parts by weight of superplasticizer, and 20 to 65 parts by weight of water, with a cement content less than 500 kg/m³ of cement, the mineral powder comprising igneous rock powder.

17. The method of claim 16 further comprising, prior to said mixing, drying a mineral powder containing sludge thereby obtain said mineral powder.

\* \* \* \* \*